United States Patent
Dandekar et al.

(10) Patent No.: US 7,603,338 B2
(45) Date of Patent: Oct. 13, 2009

(54) ENABLING INSTANT PRODUCTIVITY FUNCTIONALITY ON INFORMATION HANDLING SYSTEMS

(75) Inventors: Shree A. Dandekar, Round Rock, TX (US); Clint H. O'Connor, Austin, TX (US); Roy W. Stedman, Austin, TX (US); David Zavelson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 11/682,552

(22) Filed: Mar. 6, 2007

(65) Prior Publication Data

US 2008/0222076 A1    Sep. 11, 2008

(51) Int. Cl.
*G06F 17/30* (2006.01)
(52) U.S. Cl. .......................................... 707/1
(58) Field of Classification Search ..................... 707/2, 707/10, 1; 713/100
See application file for complete search history.

(56) References Cited

U.S. PATENT DOCUMENTS

| | | | |
|---|---|---|---|
| 6,298,427 B1 | 10/2001 | Beelitz | 711/173 |
| 6,327,706 B1 | 12/2001 | Amberg et al. | 717/11 |
| 6,330,653 B1 | 12/2001 | Murray et al. | 711/173 |
| 6,427,091 B1 | 7/2002 | Davis et al. | 700/115 |
| 6,550,062 B2 | 4/2003 | Barajas et al. | 717/178 |
| 6,714,937 B1 | 3/2004 | Eynon et al. | 707/102 |
| 6,721,946 B1 | 4/2004 | Fogarty et al. | 717/175 |
| 6,763,458 B1 * | 7/2004 | Watanabe et al. | 713/100 |
| 6,765,788 B2 | 7/2004 | Wu | 361/680 |
| 2002/0049679 A1 | 4/2002 | Russell et al. | 705/52 |
| 2005/0018873 A1 | 1/2005 | Rhoads | 382/100 |
| 2005/0114265 A1 | 5/2005 | Satkunanathan et al. | 705/59 |
| 2005/0114266 A1 | 5/2005 | Satkunanathan et al. | 705/59 |

OTHER PUBLICATIONS http:ontology.buffalo.edu/document_ontology/RT_DRM.pdf: Ceusters, W. and Smith, B. "Referent Tracking for Digital Rights Management" Jul. 26, 2006 (8 pages).
http://www.microsoft.com/windows/products/windowsvista/features/details/sideshow.mspx: "Windows Vista: Features Explained: Windows Sideshow" Microsoft Corporation May 2007 (4 pages).

* cited by examiner

*Primary Examiner*—Etienne P LeRoux
(74) *Attorney, Agent, or Firm*—Hamilton & Terrile, LLP; Stephen A. Terrile

(57) ABSTRACT

A method for enabling instant on access of productivity content on an information handling system. The method includes providing the information handling system with a first operating system partition and a second operating system partition wherein the first operating system partition is a main operating system partition and the second operating system partition is an instant on operating system partition, storing a synchronization management module within the first operating system partition, storing a productivity module within the second operating system partition, synchronizing productivity content stored on the first operating system partition with the productivity module via the synchronization management module, and accessing the synchronized productivity content via the productivity module of the second operating system partition.

22 Claims, 4 Drawing Sheets

ENABLING INSTANT PRODUCTIVITY FUNCTIONALITY ON INFORMATION HANDLING SYSTEMS

BACKGROUND OF THE INVENTION

1. Field of the Invention

The present invention relates information handling systems, and more particularly to enabling instant productivity functionality on information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with a MediaDirect application. MediaDirect is an example of an instant on media application which provides an instant on function (e.g., less than 15 second boot up) to enable fast access to files such as media files. Known MediaDirect enabled systems can include the MediaDirect solution via a separate (possibly hidden) partition. In some MediaDirect enabled systems, the separate partition image includes an XP embedded (XPe) operating system (OS), platform drivers and the MediaDirect application.

Known MediaDirect enabled systems present challenges. For example, a. MediaDirect partition can be directly accessed by the customer when the customer actuates a MediaDirect button. However, while the user has access to a rich multimedia experience, the user does not have access to all of the data stored on the information handling system when accessing the MediaDirect partition. This data can include, for example, productivity data. Productivity data includes data that is generally accessible via a personal information manager (PIM) application such as the Microsoft Outlook application which may be part of an application suite such as the Microsoft Office application suite. PIM application data can include email data, contact data and calendar data. Other examples of PIM application data can include word processor data as well as presentation and spreadsheet data.

With known information handling systems, generally the only way for the user to access productivity related data on the system is via a normal OS boot up process (assuming the user is trying to access the productivity data from the S4 or S5 states of the information handing system). A normal OS boot up process is a process by which the information handling system boots into the operating system partition. This process is generally more time consuming than booting into the instant on media application. An example of a use case in which it would be desirable to enable access to productivity functionality and data is when a customer is traveling or is between meetings and wishes to check Inbox, Contacts or Calendar data faster than would be possible by booting to the main OS and waiting for the email client to load.

It would be desirable enable access to productivity functionality and data via an instant on partition of information handling systems. For example, it would be desirable to provide the ability to view calendar appointments for the day without having to boot into the main OS and launch an Email Client or calendar application such as the Microsoft Office Calendar function. Also for example, it would be desirable to provide the ability to view contacts instantly without booting to the main OS and launching a default Email Contact Client such as the Microsoft Outlook Express Contacts client, the Microsoft Office Contacts client, or the Yahoo Contacts client. Also for example, it would be desirable to provide the ability to view a snapshot of a user's emails in the user's Inbox and to read the emails.

SUMMARY OF THE INVENTION

In accordance with the present invention, an information handling system is provided with an instant on partition via which productivity data can be accessed. The information handling system includes an instant on synchronization management module via which productivity data stored within a main operating system partition is synchronized with an instant on productivity module which is stored within the instant on partition.

The combination of the instant on synchronization management module and the instant on productivity module provides a productivity mechanism via which a user can synchronize and substantially instantly access productivity data including Calendar data, Contacts data and Email data from within the instant on partition. In one embodiment, the synchronization management module synchronizes data from a plurality of productivity applications including the Outlook Express productivity application, the Office 2003 productivity application, the Office 2007 productivity application, the Vista Contacts productivity application, the Vista Calendar productivity application, the Yahoo email and contacts productivity application, and the MSN Contacts and Email productivity application.

In certain embodiments, the synchronization management module executes using a policy that can be updated by a user. Thus, the user may choose to synchronize productivity data on a daily basis or on a periodic basis. Also, in certain embodiments, the synchronization management module can manage login credentials for the user. Thus, a single information handling system can have multiple users and each user can have multiple Email accounts. Also, in certain embodiment, the synchronization management module can be responsible for handling authentication for multiple users. Thus, a user can set a single password for all accounts under a particular user login.

After a successful synchronization, a user can boot into an instant on partition and use the instant on application to view the synchronized productivity content. In certain embodiments, before accessing the productivity content the user selects a specific account and also provides authentication to be able to access the content for that particular account. The synchronization management module controls synchronization of content between different user accounts on the main OS and each user in turn can have multiple email accounts.

For example the synchronization management module allows a plurality of types of users on a single system.

In one embodiment, the invention relates to a method for enabling instant on access of productivity content on an information handling system. The method includes providing the information handling system with a first operating system partition and a second operating system partition wherein the first operating system partition is a main operating system partition and the second operating system partition is an instant on operating system partition, storing a synchronization management module within the first operating system partition, storing a productivity module within the second operating system partition, synchronizing productivity content stored on the first operating system partition with the productivity module via the synchronization management module, and accessing the synchronized productivity content via the productivity module of the second operating system partition.

In another embodiment, the invention relates to an apparatus for enabling instant on access of productivity content on an information handling system. The apparatus includes a first operating system partition and a second operating system partition wherein the first operating system partition is a main operating system partition, the second operating system partition is an instant on operating system partition, a synchronization management module stored within the first operating system partition, a productivity module within the second operating system partition, means for synchronizing productivity content stored on the first operating system partition with the productivity module via the synchronization management module, and means for accessing the synchronized productivity content via the productivity module of the second operating system partition.

In another embodiment, the invention relates to an information handling system which includes a processor, memory coupled to the processor and a productivity mechanism for enabling instant on access of productivity content on an information handling system. The memory includes a first operating system partition and a second operating system partition wherein the first operating system partition is a main operating system partition and the second operating system partition is an instant on operating system partition. The productivity mechanism includes a synchronization management module stored within the first operating system partition, a productivity module within the second operating system partition, the productivity mechanism synchronizing productivity content stored on the first operating system partition with the productivity module via the synchronization management module, and accessing the synchronized productivity content via the productivity module of the second operating system partition.

In another embodiment, the invention relates to a method for enabling instant on access of productivity content on an information handling systems which includes providing the information handling system with a first memory portion and a second memory portion wherein the first portion is a main memory portion and the second memory portion is an instant on memory portion, storing productivity content within the first memory portion, storing a synchronization management module in the first memory portion, storing a productivity module within the second memory portion, synchronizing the productivity content with the productivity module via the synchronization management module, and accessing synchronized productivity content via the productivity module of the second memory portion.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
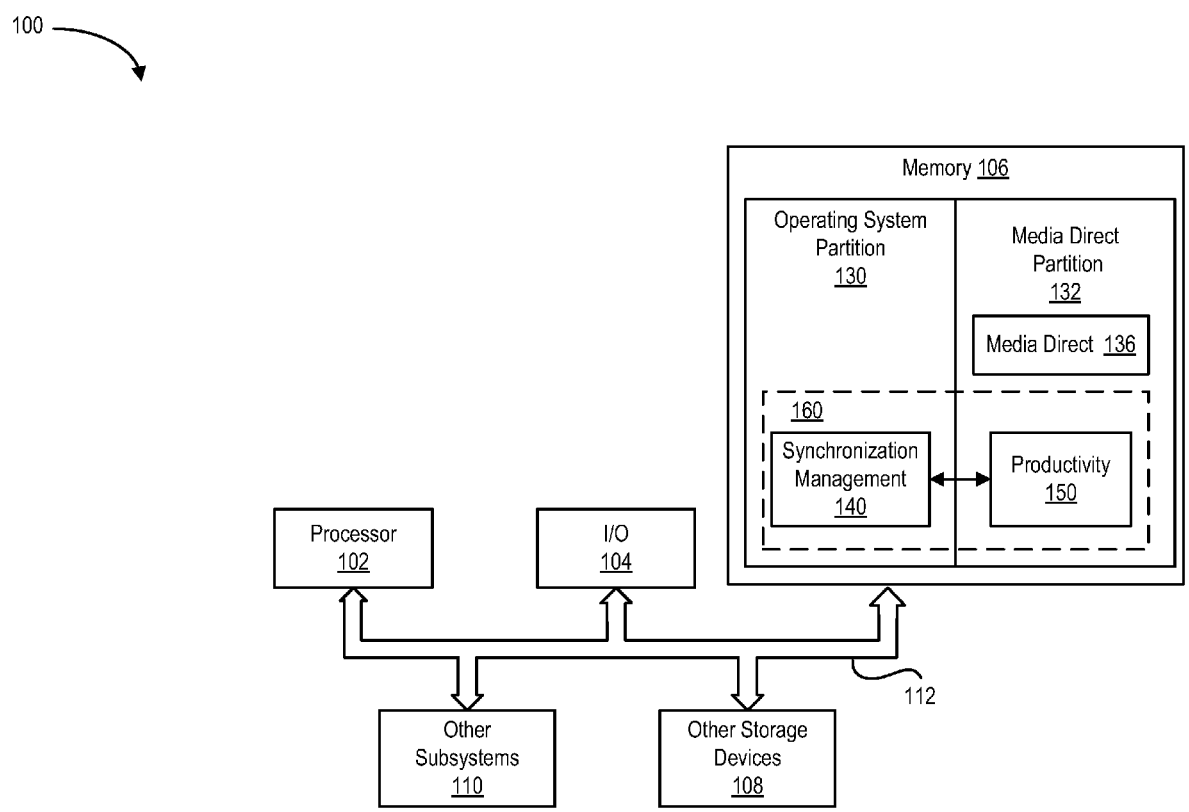
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers, memory 106 including non-volatile memory such as a hard disk drive and volatile memory such as random access memory, and other storage devices 108, such as a CD ROM or DVD disc and drive, and various other subsystems 110, all interconnected via one or more buses 112. The hard disk drive of the memory 106 includes a main operating system partition 130 and an instant on (e.g., Media-Direct) partition 132. The instant on partition 132 includes an instant on media (e.g., MediaDirect) application 136. The main operating system partition 130 includes a synchronization management module 140 and the instant on partition 132 includes an instant on productivity module 150. The synchronization management module 140 communicates with the instant on productivity module 150. The combination of the synchronization management module 140 and the instant on productivity module 150 provides a productivity mechanism 160.

Productivity data can be accessed via the instant on partition 132 using the productivity mechanism 160. More specifically, productivity data stored within the main operating system partition 130 is synchronized with the instant on partition 132 using the synchronization management module 140.

With the productivity mechanism 160, a user can synchronize and substantially instantly access productivity data including Calendar data, Contacts data and Email data from within the instant on partition 132. In one embodiment, the synchronization management module 140 synchronizes data from a plurality of productivity applications including the Outlook Express productivity application, the Office 2003 productivity application, the Office 2007 productivity application, the VISTA Contacts productivity application, the VISTA Calendar productivity application, the Yahoo email and contacts productivity application, and the MSN Contacts and Email productivity application.

In certain embodiments, the synchronization management module 140 executes using a policy that can be updated by a user. Thus, the user may choose to synchronize productivity data on a daily basis or on a periodic basis. Also, in certain embodiments, the synchronization management module can manage login credentials for the user. Thus, a single information handling system 100 can have multiple users and each user can have multiple Email accounts. Also, in certain embodiment, the synchronization management module can be responsible for handling authentication for multiple users. Thus, a user can set a single password for all accounts under a particular user login.

After a successful synchronization, a user can boot into the instant on partition 132 and use the instant on application to view the synchronized productivity content. In certain embodiments, before accessing the productivity content the user selects a specific account and also provides authentication to be able to access the content for that particular account. The synchronization management module 140 controls synchronization of content between different user accounts on the main OS partition 130 and each user in turn can have multiple email accounts. For example the synchronization management module 140 allows a plurality of types of users on a single system For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
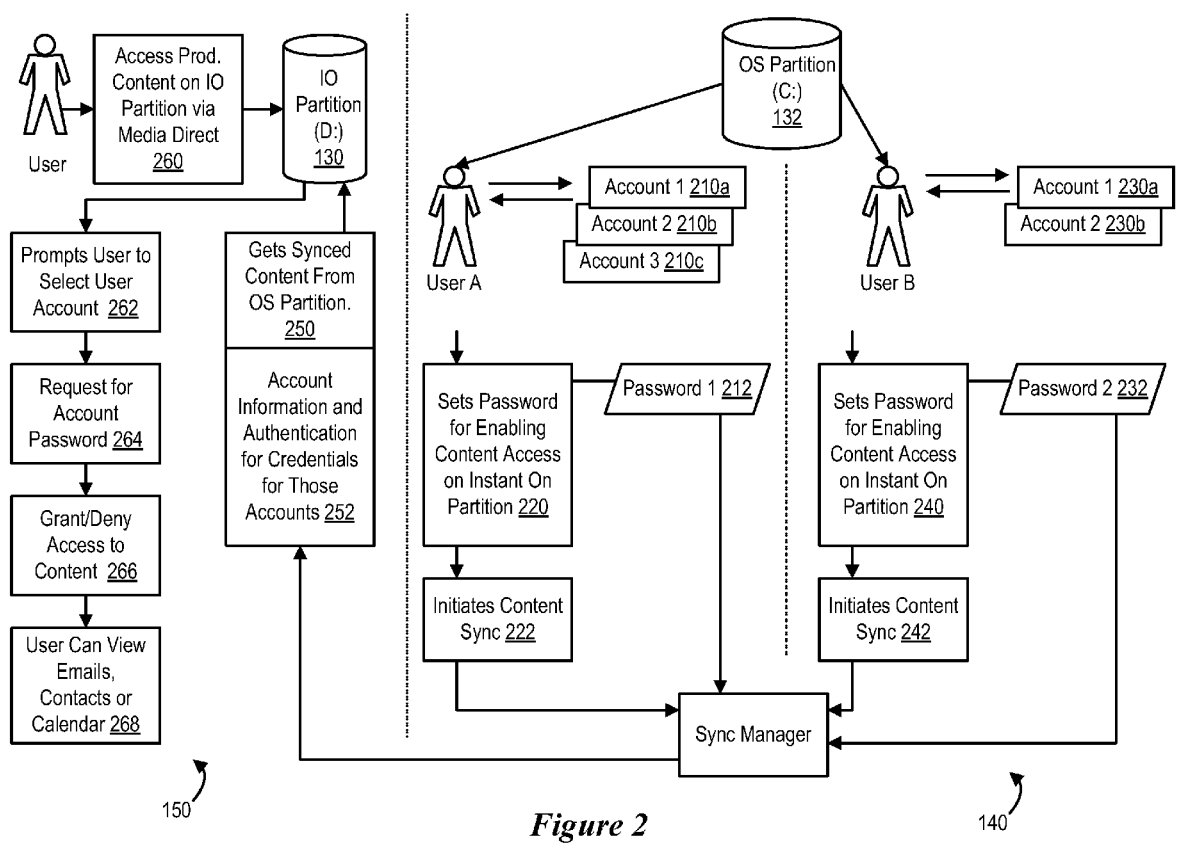
FIG. 2 shows a block diagram of the operation of the productivity mechanism of the information handling system.

Referring to FIG. 2, a block diagram of the operation of the productivity mechanism 160 of the information handling system 100 is shown. More specifically, within the synchronization management module 140, a first user (user A) may configure one or more productivity accounts (e.g., account 1 210a, account 2 210b, account 3 210c) within the main operating system partition 132. Each of these accounts 210 may be, for example, a different type of email client. When configuring the accounts, the first user may set a single password (password 1 212) for enabling content access via the instant on partition 130 at step 220. After setting the password, the user initiates a content synchronization operation at step 222. Upon initiation of the content synchronization operation, a synchronization manager 224 synchronizes the password and the user a productivity data with the instant on partition.

A second user (user B) may configure one or more productivity accounts (e.g., account 1 230a, account 2 230b). Each of these accounts may be, for example, a different type of email client. When configuring the accounts, the second user may set a single password (password 2 232) for enabling content access via the instant on partition 130 at step 240. After setting the password, the user initiates a content synchronization operation at step 242. Upon initiation of the content synchronization operation, the synchronization manager 224 synchronizes the password and the user a productivity data with the instant on partition.

The synchronization management module 140 synchronizes productivity content for each of the plurality of users as well as for each of the plurality of productivity accounts. For example the synchronization manager module allows a plurality of types of users on a single system. These plurality of types of users and plurality of productivity accounts can include for example, USER A, an administrative type user having multiple email accounts ex: hotmail, yahoo, corporate, gmail;

USER B, an administrative type user having multiple email accounts ex: hotmail, yahoo, corporate, gmail;

USER C, a power user type user having multiple email accounts ex: hotmail, yahoo, corporate, gmail; and, USER D, a guest type user having multiple email accounts ex: hotmail, yahoo, corporate, gmail.

Next, the instant on productivity module 150 obtains the synchronized content from the OS partition at step 250 and obtains account information and authentication information for credentials for the identified accounts at step 252.

When a user attempts to access productivity content via the instant on productivity application at step 260, the instant on productivity application prompts the user to select a user account at step 262. Next, the instant on productivity application generates a request for the account password for the identified account at step 264. Next, the instant on productivity application either grants or denies access to the content at step 266. If the user is granted access to the content, then the user can view productivity content such as email data, contact data or calendar data at step 268. Thus, the instant on productivity application enables the information handling system to provide a personal digital assistant (PDA) function that is substantially instantly available (i.e., that is available without having to boot up a complete operating system).

Figure 3:
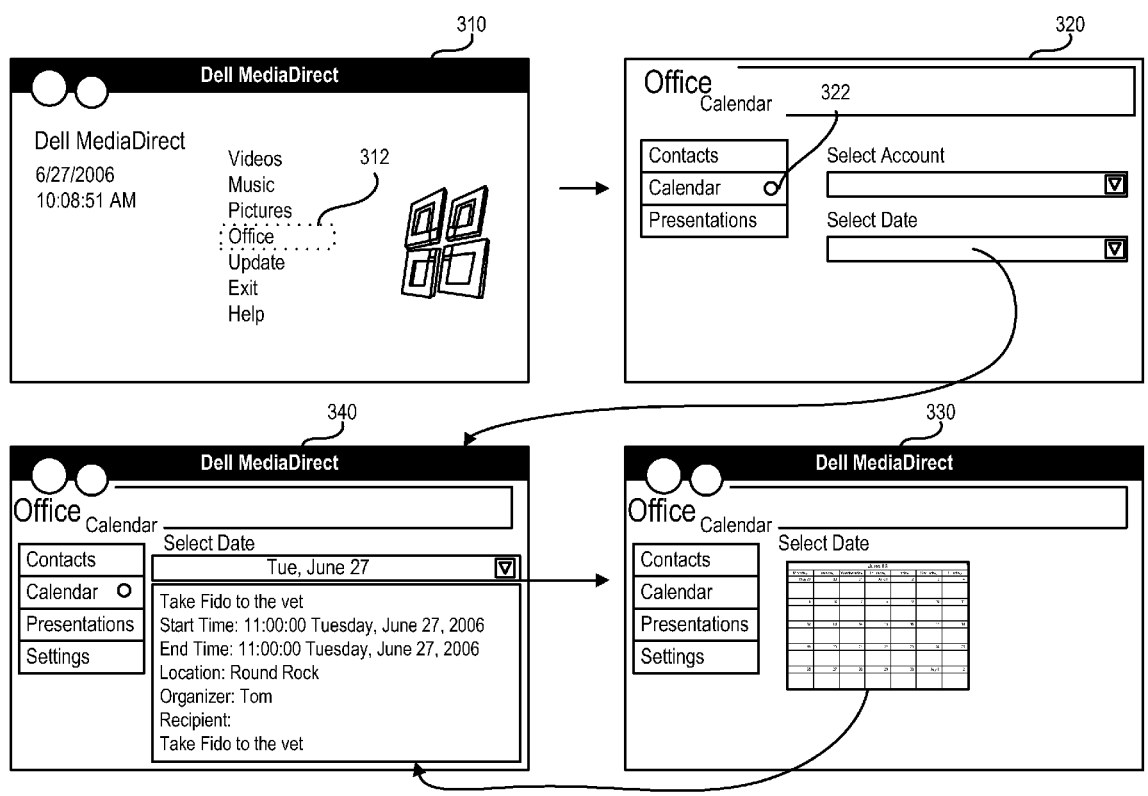
FIG. 3 shows example screen presentations of the productivity module of the productivity mechanism of the information handling system.

Referring to FIG. 3, example screen presentations of the productivity module 150 of the productivity mechanism 160 of the information handling system 100 is shown. More specifically, the media direct application 136 generates a media direct screen presentation 310. Within the media direct screen presentation, one of the options that can be selected by a user is to access the productivity data (e.g., via the Office selection 312). When a user actuates the productivity data option, the user is presented with a productivity data screen presentation 320 generated by the productivity module 150. From the productivity data screen presentation 320, a user can select a plurality of types of productivity data to view. The user can also select a particular account of data to view.

For example, if the user actuates the calendar indication 322 within the productivity data screen presentation 320, the user is presented with a calendar data screen presentation 330. From the calendar data screen presentation 330, a user can navigate to a particular date. When a user navigates to a particular date, the user is presented with another calendar date screen presentation 340. The user can navigate to another date via the calendar date screen presentation 340 or can navigate back to the calendar date screen presentation 330.

Figure 4:
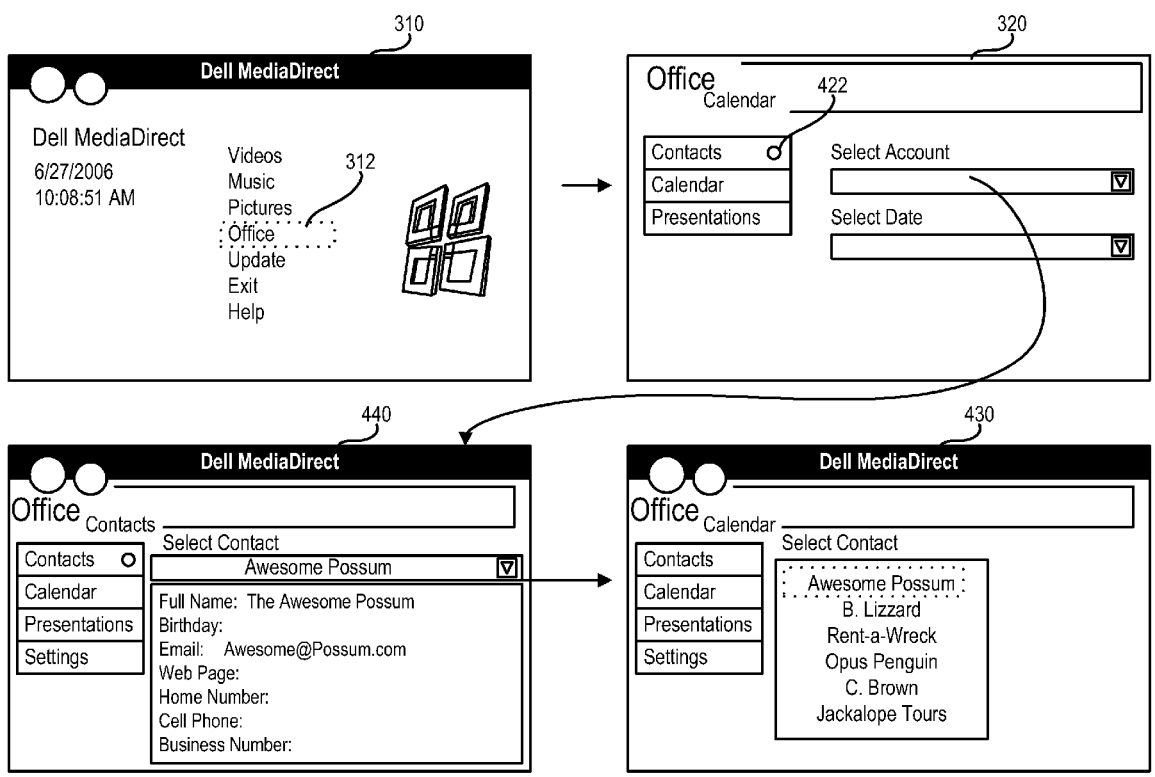
FIG. 4 shows example screen presentations of the productivity module of the productivity mechanism of the information handling system.

Referring to FIG. 4, example screen presentations of the productivity module 150 of the productivity mechanism 160 of the information handling system 100 is shown.

From the productivity data screen presentation 320, if the user actuates the contacts indication 422 within the productivity data screen presentation 320, the user is presented with a contacts data screen presentation 430. From the contacts data screen presentation 430, a user can navigate to a particular contact. When a user navigates to a particular contact, the user is presented with another contact data screen presentation 440. The user can navigate to another contact via the contact data screen presentation 440 or can navigate back to the contact screen presentation 430.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, rather than or in addition to an instant on partition, a view application can be embedded within a basic input output system (BIOS) of the information handling system. The view application would enable quickly viewing synchronized productivity data stored on the main operating system partition. Such a view application might speed viewing of certain productivity data, but would have more limited productivity functionality than the productivity application 150.

Also for example, the instant on application may be stored within a location other than a separate partition (e.g., the instant on application could be stored within a flash memory device).

Also for example, the synchronization manager need not be entirely within the operating system partition. While certain portions of the synchronization manager (e.g., registry data, etc.) are stored within the operating system partition, other portions of the synchronization manager could reside in the same location as the data being synchronized.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for enabling instant on access of productivity content on an information handling system comprising
providing the information handling system with a first operating system partition and a second operating system partition, the first operating system partition being a main operating system partition, the second operating system partition being an instant on operating system partition;
storing a synchronization management module within the first operating system partition;
storing a productivity module within the second operating system partition;
synchronizing productivity content stored on the first operating system partition with the productivity module via the synchronization management module; and,
accessing the synchronized productivity content via the productivity module of the second operating system partition.

2. The method of claim 1 wherein
the synchronization management module and the productivity module provide an instant on productivity access mechanism.

3. The method of claim 1 wherein
the productivity content includes at least one of Calendar data, Contacts data and Email data.

4. The method of claim 1 wherein
the synchronization management module synchronizes data from a plurality of productivity applications.

5. The method of claim 1 wherein
the synchronization management module executes using a policy that can be updated by a user.

6. The method of claim 1 wherein
the synchronization management module executes manages login credentials for a user.

7. The method of claim 1 wherein
the synchronization management module is responsible for handling authentication for multiple users.

8. An apparatus for enabling instant on access of productivity content on an information handling system comprising
a first operating system partition and a second operating system partition, the first operating system partition being a main operating system partition, the second operating system partition being an instant on operating system partition;
a synchronization management module stored within the first operating system partition;
a productivity module within the second operating system partition;
means for synchronizing productivity content stored on the first operating system partition with the productivity module via the synchronization management module; and,
means for accessing the synchronized productivity content via the productivity module of the second operating system partition.

9. The apparatus of claim 8 wherein
the synchronization management module and the productivity module provide an instant on productivity access mechanism.

10. The apparatus of claim 8 wherein
the productivity content includes at least one of Calendar data, Contacts data and Email data.

11. The apparatus of claim 8 wherein
the synchronization management module synchronizes data from a plurality of productivity applications.

12. The apparatus of claim 8 wherein
the synchronization management module executes using a policy that can be updated by a user.

13. The apparatus of claim 8 wherein
the synchronization management module executes manages login credentials for a user.

14. The apparatus of claim 8 wherein the synchronization management module is responsible for handling authentication for multiple users.

15. An information handling system comprising:
a processor;
memory coupled to the processor, the memory including a first operating system partition and a second operating system partition, the first operating system partition being a main operating system partition, the second operating system partition being an instant on operating system partition;
a productivity mechanism for enabling instant on access of productivity content on an information handling system comprising
a synchronization management module stored within the first operating system partition;
a productivity module within the second operating system partition;
the productivity mechanism synchronizing productivity content stored on the first operating system partition with the productivity module via the synchronization management module; and,
accessing the synchronized productivity content via the productivity module of the second operating system partition.

16. The information handling system of claim 15 wherein the synchronization management module and the productivity module provide an instant on productivity access mechanism.

17. The information handling system of claim 15 wherein the productivity content includes at least one of Calendar data, Contacts data and Email data.

18. The information handling system of claim 15 wherein the synchronization management module synchronizes data from a plurality of productivity applications.

19. The information handling system of claim 15 wherein the synchronization management module executes using a policy that can be updated by a user.

20. The information handling system of claim 15 wherein the synchronization management module executes manages login credentials for a user.

21. The information handling system of claim 15 wherein the synchronization management module is responsible for handling authentication for multiple users.

22. A method for enabling instant on access of productivity content on an information handling systems comprising
providing the information handling system with a first memory portion and a second memory portion, the first portion being a main memory portion, the second memory portion being an instant on memory portion;
storing productivity content within the first memory portion;
storing a synchronization management module in the first memory portion;
storing a productivity module within the second memory portion;
synchronizing the productivity content with the productivity module via the synchronization management module; and,
accessing synchronized productivity content via the productivity module of the second memory portion.

* * * * *